July 30, 1929. A. H. MAUDE 1,722,532
PROCESS FOR MANUFACTURING GLACIAL ACETIC ACID
Filed Sept. 18, 1926
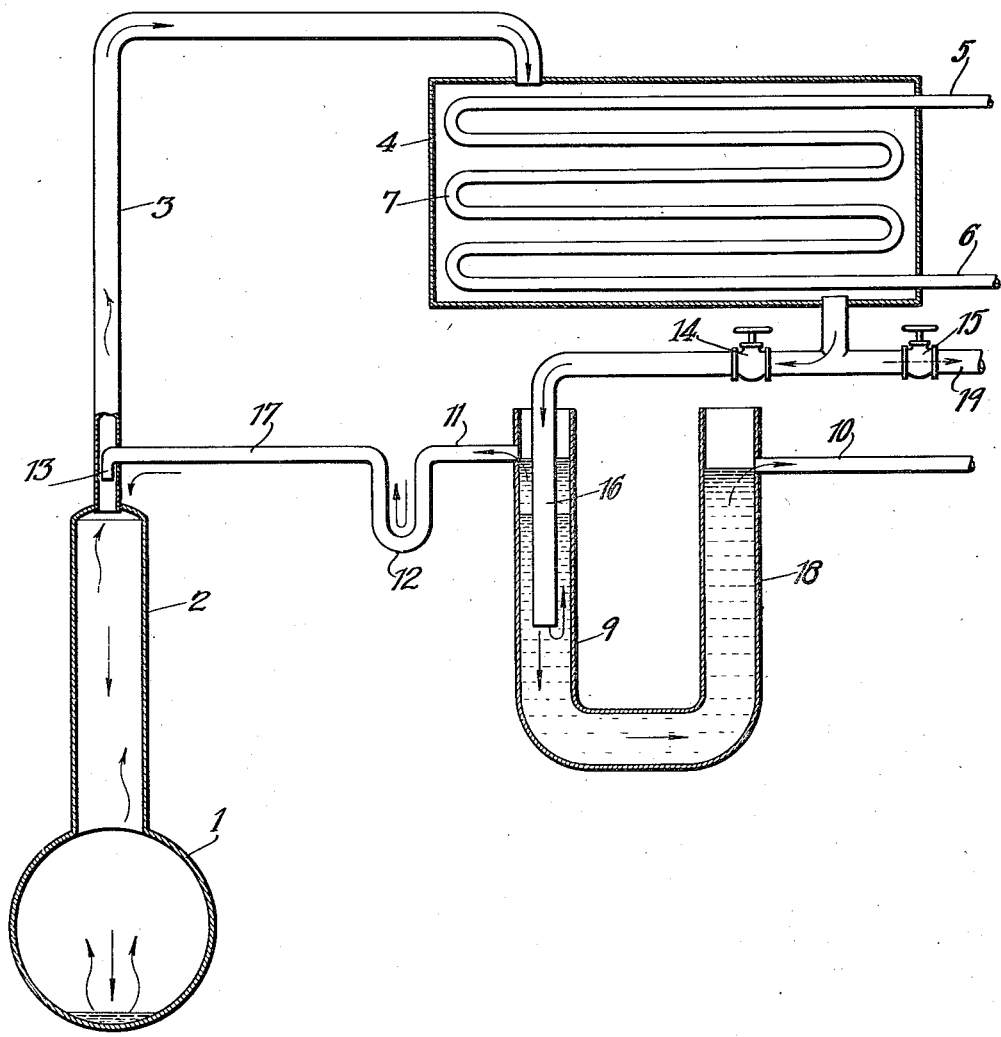
Inventor
AYLMER H. MAUDE.
By His Attorney
R. d. Sibley.

Patented July 30, 1929.

1,722,532

UNITED STATES PATENT OFFICE.

AYLMER H. MAUDE, OF NITRO, WEST VIRGINIA, ASSIGNOR TO THE RUBBER SERVICE LABORATORIES COMPANY, OF AKRON, OHIO, A CORPORATION OF OHIO.

PROCESS FOR MANUFACTURING GLACIAL ACETIC ACID.

Application filed September 18, 1926. Serial No. 136,237.

The present invention is directed to the art of obtaining glacial acetic acid from a water solution thereof by means of a process wherein a single distillation step is employed.

The invention will be readily understood from the following description with reference to the drawing, which represents in sectional view one preferred type of apparatus for carrying out the process.

Heretofore, glacial acetic acid has usually been manufactured by the decomposition of a salt of acetic acid such as sodium or calcium acetate, by heating the salt with an acid, such as sulfuric acid. The acetic acid that was thereby evolved was then fractionated, purified and condensed. My new process, as hereinafter set forth, produces an equally pure and substantially anhydrous acid by a much simpler process direct from an acetic acid solution.

Referring to the drawing, acetic acid of approximately 90% concentration, which can be obtained from a more dilute acid by a distillation process while employing efficient fractionated means, is placed in a flask or still 1. To this solution of acetic acid contained in the still 1, there is added a liquid which is substantially insoluble in and has a specific gravity different from and preferably less than that of water. The liquid should also boil at a temperature sufficiently below the boiling point of glacial acetic acid (119° C.) to permit its ready separation therefrom by distillation means. The quantity of liquid employed depends upon the proportions of water present in the acetic acid used, and for the 90% acid mentioned in the example, approximately 20% by volume of benzol, for example, is sufficient to accomplish the dehydration of the acid. The concentration of a weaker acetic acid solution would require the use of a greater volume of benzol, while the concentration of a stronger acid would require a smaller proportion of benzol than that stated.

The acid-benzol-water mixture is then heated by any suitable means and the vapors therefrom rise through a fractionating tower 2 and pass through a line 3 to a condenser 4. The condenser is equipped with a coil 7 through which flows a cooling means supplied thereto through line 6 and withdrawn therefrom through line 5.

During the concentration process, valve 15 is closed and valve 14 in line 8 is opened thereby causing the liquid condensed in the condenser 4 to flow through line 8 and be delivered into a gravity settling chamber 9. The condensate comprises for the most part, a mixture of benzol and water and these substances being substantially immiscible, separate, and the benzol collects in the upper portion 16 of the separator 9 while the water separating, settles into the lower portion of the separator, fills the upright portion 18 and is withdrawn from the system by overflowing through line 10.

The benzol, which as mentioned collects in the portion 16 of the separator, overflows through the line 11 into a trap 12 and thence through line 17 and opening 13 to the still 1. The trap 12 is interposed in the line 17, as shown, to build up a pressure sufficient to cause the vapors evolved from the still to follow the course set forth. The benzol returned to the still is again vaporized, and is continuously cycled through the system as hereinbefore described.

The process is continued until substantially all the water present in the acid contained in the still 1 has been removed therefrom. This point is readily recognized from the appearance of the condensate collected from the condenser 4 and from the fact that the condensate no longer separates into a water-benzol layer. The distillation is then continued until all of the benzol or other added liquid has been removed from the still. After the water has been completely removed from the acid, the valve 14 is closed to discontinue further cycling of the benzol through the system and the valve 15 is opened and the benzol thereafter condensed in condenser 4 is withdrawn through line 19 and flowed to a receiver. The temperature of the vapors evolved from the still, as indicated by any well known recording means (not shown) increases when all the benzol has been removed from the still, and the condensate collected thereafter comprises glacial acetic acid boiling at 119° C. and solidifying to a crystalline solid melting at approximately 17.5° C.

The yield of glacial acetic acid so obtained is much greater than is possible by means of any straight distillation process even when the most effective still-heads and fractionating columns known, be employed.

Other liquids may be employed in place of the benzol mentioned in the example. Thus, petroleum ether, toluol, the lighter fractions of a casing-head gasolene, or any water insoluble liquid that is substantially inert to acetic acid and has a specific gravity less than that of water and boiling below 119° C. may be used. It is usually desirable in the process set forth to employ a quantity of liquid for the separation of water that is approximately twice the volume of the water to be removed from the acid.

What I claim is:

1. The process of manufacturing glacial acetic acid by a single stage distillation process which comprises heating a water solution containing approximately 90% of acetic acid with approximately 20% of its volume of benzol, condensing the evolved vapors therefrom, separating water from the condensate so obtained to recover the benzol therefrom and returning the benzol to the acetic acid solution.

2. The process of manufacturing glacial acetic acid by a single stage distillation process which comprises heating a water solution containing approximately 90% of acetic acid with approximately 20% of its volume of a water-insoluble liquid boiling below 119° C. and having a specific gravity less than that of water, condensing the evolved vapors therefrom, separating the condensate by gravity means into water and a lighter liquid, returning the said liquid to the acetic acid, continuing the heating and cycling of the liquid until the water is substantially completely removed from the acid and separating the said liquid from the glacial acetic acid by distillation.

3. The process of manufacturing glacial acetic acid by a single stage distillation process which comprises heating an acetic acid solution containing approximately 10% of water with approximately 20% its volume of benzol, condensing the evolved vapors therefrom, separating the condensate into a water and a benzol layer, returning the benzol to the acetic acid solution, continuing the heating and the cycling of the benzol until the water is substantially completely removed from the acid and separating the benzol from the glacial acetic acid by distillation.

4. In the process of manufacturing glacial acetic acid by a single stage distillation process from a water solution of acetic acid containing substantially 10% of water, the step which comprises heating the acid solution with approximately 20% its volume of benzol.

5. In the process of manufacturing glacial acetic acid by a single stage distillation process from a water solution of acetic acid, the step which comprises heating the acid solution with a quantity of benzol approximately equal to twice the volume of the water to be removed from said acid solution.

In testimony whereof I affix my signature.

AYLMER H. MAUDE.